(12) United States Patent
Blair

(10) Patent No.: US 12,482,756 B2
(45) Date of Patent: Nov. 25, 2025

(54) CONNECTIVITY LAYER IN 3D DEVICES

(71) Applicant: XILINX, INC., San Jose, CA (US)

(72) Inventor: Zachary Blair, San Jose, CA (US)

(73) Assignee: XILINX, INC., San Jose, CA (US)

(*) Notice: Subject to any disclaimer, the term of this patent is extended or adjusted under 35 U.S.C. 154(b) by 654 days.

(21) Appl. No.: 17/879,670

(22) Filed: Aug. 2, 2022

(65) Prior Publication Data
US 2024/0047364 A1 Feb. 8, 2024

(51) Int. Cl.
*H01L 23/538* (2006.01)
*G06F 12/1027* (2016.01)
*G06F 15/78* (2006.01)
*H01L 25/065* (2023.01)

(52) U.S. Cl.
CPC ...... *H01L 23/5386* (2013.01); *G06F 12/1027* (2013.01); *G06F 15/7825* (2013.01); *H01L 23/5382* (2013.01); *H01L 25/0657* (2013.01); *H01L 2225/06517* (2013.01); *H01L 2225/06527* (2013.01); *H01L 2225/06541* (2013.01)

(58) Field of Classification Search
CPC ............ H01L 23/5386; H01L 23/5382; H01L 25/0657; H01L 2225/06517; H01L 2225/06527; H01L 2225/06541; H01L 25/18; G06F 12/1027; G06F 15/7825
See application file for complete search history.

(56) References Cited

U.S. PATENT DOCUMENTS 5,793,115 A * 8/1998 Zavracky ............... H01L 24/24
257/E21.705
10,673,440 B1 * 6/2020 Camarota ............... G06F 7/483

* cited by examiner

*Primary Examiner* — Daniel D Chang
(74) *Attorney, Agent, or Firm* — Patterson + Sheridan, LLP

(57) ABSTRACT

Embodiments herein describe a 3D stack of dies (e.g., an active-on-active (AoA) stack) with a connectivity die that enables the decoupling of processing regions in coupled dies from each other and from the physical location of I/O blocks on an I/O die. For example, the first die may have a plurality of hardware processing blocks that are arranged in a regular manner (e.g., an array with rows and columns). The connectivity die can include interconnects that couple these hardware processing blocks to I/O blocks in a second die. These I/O blocks may be arranged in an irregular manner. The interconnects in the connectivity die can provide fair access so that processing blocks on a first side of the first die can access an I/O block on the opposite side of the second die without using resources for neighboring processing blocks.

17 Claims, 6 Drawing Sheets

CONNECTIVITY LAYER IN 3D DEVICES

TECHNICAL FIELD

Examples of the present disclosure generally relate to providing a connectivity die in a stack of dies to permit regularly arranged hardware components in a first semiconductor die to access irregularly arranged input/output (I/O) components in a second semiconductor die.

BACKGROUND

Planar programmable device architectures are limited in their ability to include additional services, e.g. hardened interconnects, due to the disruption any non-programmable fabric logic causes to the regular structures. Including hardened interconnects, memories, or microcontrollers displace core compute elements (look-up tables (LUTs), digital signal processors (DSPs), and interconnect fabric), worsening the timing characteristics and quality of the primary function of a device. For devices with high speed I/O at the periphery (e.g., high bandwidth memory (HBM), Serializer/Deserializer (SerDes)), distribution of the I/O bandwidth to the compute elements spread across the device area is challenging. A hardened solution cannot be extended to deliver the full I/O bandwidth without harming the core function of the device. Thus, the same interconnect fabric used for global communication is also used for local compute implementation, necessitating a monolithically complied field programmable gate array (FPGA) design.

Using monolithically compiled programmable logic poses a challenge to extracting the most value out of the runtime programmability of FPGAs. Other solutions provide coarse-grained regions of fabric in which the only I/O available to a region is local to the region, with limited or no communication to other blocks. The impact of these solutions is that users, including software designers, must be aware of the underlying device architecture to map theft accelerator logic to programmable devices.

3D architectures, however, enable the decoupling of compute resources from device architecture details such as I/O locations, giving software users an abstracted view of virtual hardware resources without disrupting fabric and compromising on performance.

SUMMARY

One embodiment describes a stack that includes a first semiconductor die comprising a plurality of regularly arranged processing blocks, a second semiconductor die comprising a plurality of irregularly arranged I/O blocks, a connectivity die disposed between the first die and the second die in the stack, the connectivity die comprising configurable interconnects configured to permit the plurality of processing blocks to communicate with the plurality of I/O blocks.

Another embodiment described herein is a stack that includes a first semiconductor die comprising a plurality of regularly arranged processing blocks, a second semiconductor die comprising a plurality of irregularly arranged hardware blocks, a connectivity die disposed between the first die and the second die in the stack where the connectivity die comprising interconnects that are programmable to permit each of the plurality of processing blocks to communicate with each of the plurality of hardware blocks.

Another embodiment described herein is a stack that includes a first semiconductor die comprising a plurality of regularly arranged processing blocks and a connectivity die comprising interconnects and a plurality of irregularly arranged hardware blocks, wherein the interconnects are programmable to permit each of the plurality of processing blocks in the first die to communicate with each of the plurality of hardware blocks in the connectivity die.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
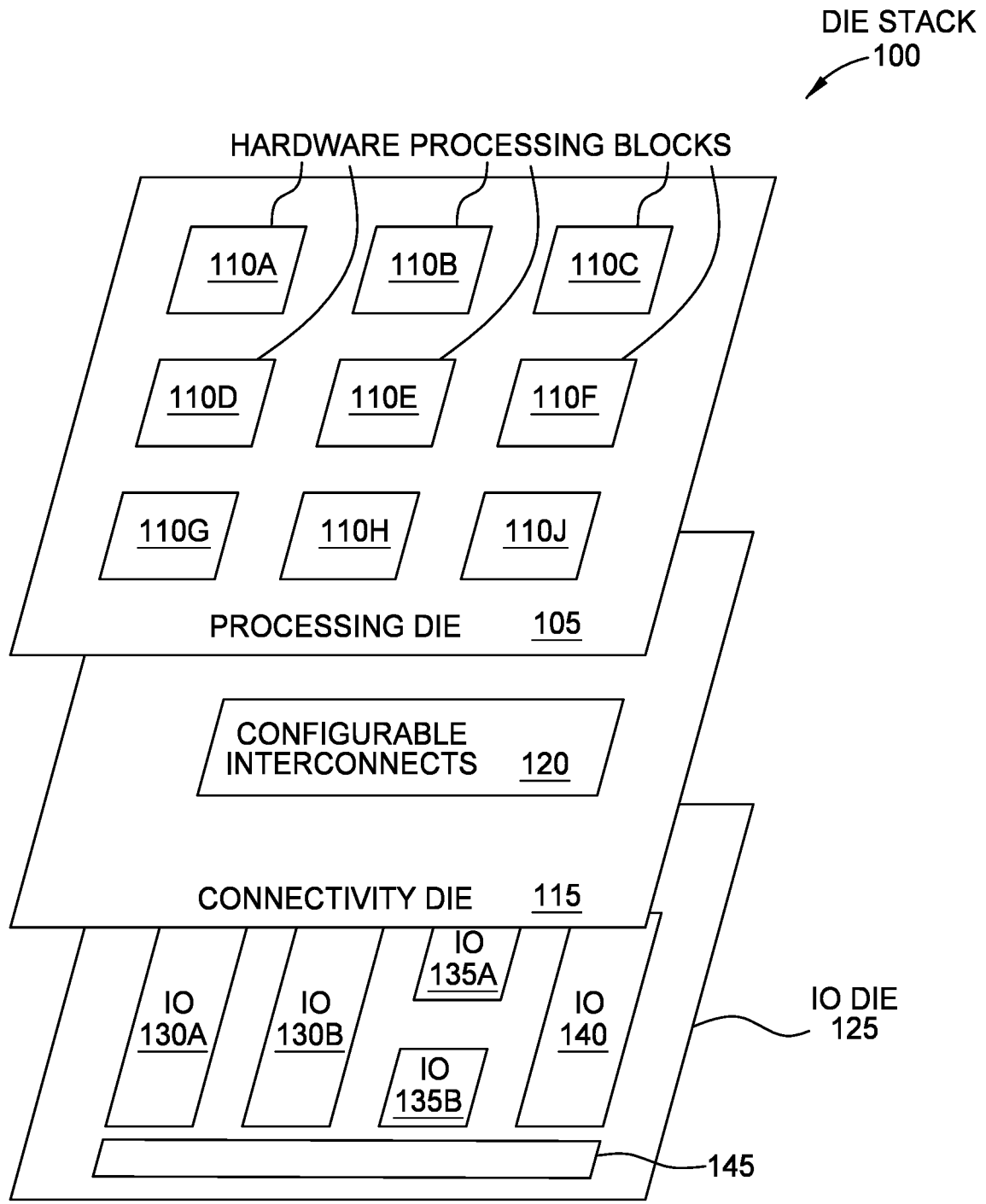
FIG. 1 illustrates a stack of dies that includes a connectivity die, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a 3D stack of dies (e.g., an active-on-active (ADA) stack) with a connectivity die that enables the decoupling of processing regions in coupled dies from each other and from the physical location of I/O blocks on an I/O die. For example, the first die may have a plurality of hardware processing blocks (e.g., processors, cores, clock regions in a programmable fabric, digital signal processors, data processing engines, etc.) that are arranged in a regular manner (e.g., an array with rows and columns). The connectivity die can include interconnects that couple these hardware processing blocks to I/O blocks in a second die. These I/O blocks may be arranged in an irregular manner. For example, a first I/O block for coupling to an HBM may be disposed on a first side of the second die while a second I/O block for coupling to a neighboring stack of dies is disposed on a second side and a third I/O block for coupling to a chiplet is on a third side, and so forth. The interconnects in the connectivity die can provide fair access so that processing blocks on a first side of the first die can access an I/O block on the opposite side of the second die without using resources for neighboring processing blocks. Thus, the embodiments herein can avoid monolithically compiled programmable logic by achieving segmentability while providing fair access to the irregularly arranged I/O blocks.

FIG. 1 illustrates a die stack 100 that includes a connectivity die, according to an embodiment. The stack 100 includes three dies: a processing die 105, connectivity die 115, and an I/O die 125. In one embodiment, each die is a semiconductor die—e.g., an integrated circuit (IC). Although not shown, the stack 100 may be disposed on an interposer. Other semiconductor dies and structures may be disposed on the same interposer such as other die stacks, memories, chiplets, etc. The interposer can provide communication paths between these different devices.

The processing die 105 includes regularly arranged hardware processing blocks 110. "Regularly arranged" means these blocks are arranged in a repeatable pattern. In this case, the processing blocks 110 are arranged in rows and columns that are aligned. However, in another embodiment, the processing blocks 110 may be offset where every other row is offset from the neighboring rows.

In one embodiment, each processing block 110 is the same hardware structure. That is, the hardware in the processing blocks 110 may be substantially the same (e.g., copies). Thus, the processing blocks 110 may be homogeneous processing blocks. Some non-limiting examples of the processing blocks 110 can be multiple processors (e.g., central processing units (CPUs)), multiple cores for the same processor, graphic processing units (GPUs). DSPs, clock regions in a fabric of programmable logic, data processing engines (DPEs), and the like.

In contrast to the processing die 105, the I/O die 125 includes hardware elements (i.e., I/O blocks) that are arranged irregularly in the die 125. That is, the I/O blocks are not arranged in a repeatable pattern. This may because the I/O blocks are different types of I/O interfaces or because the I/O blocks are arranged at different sides of the die 125 to interface with external devices (not shown).

In this example, the I/O die 125 includes I/O 130A and 130B which are one type of I/O interface, I/O 135A and 135B which are another type of I/O interface, I/O 140 which is another type of I/O interface, and I/O 145 which is another type of I/O interface. For example, the I/O 130A and 130B may be hardware I/O interfaces for communicatively coupling the I/O die 125 (and the stack 100 in general) to an external device disposed at the left side of the stack 100, the I/O 145 may be a hardware I/O interface for communicatively coupling the I/O die 125 to an external device disposed at the bottom side of the stack 100, and the I/O 135 and 140 may be hardware I/O interfaces for communicatively coupling the I/O die 125 to two external devices disposed at the right side of the stack 100. For example, the external devices may be different, and thus, the I/O 130, 135, 140, and 145 may all be different. Thus, in this embodiment, the I/O die 125 includes heterogeneous I/O blocks or I/O interfaces.

As non-limiting examples, the I/O 130, 135, 140, and 145 may be I/O blocks for communicating with external memory devices (e.g., HBM), chiplets (where the I/O die 125 serves as the anchor die), other die stacks, and the like). For example, the I/O 130, 135, 140, and 145 can be I/O banks plus DOR memory, Universal Chiplet Interconnect. Express (UCle) interfaces, High-Bandwidth Interconnect (HBI) interfaces, HBM interfaces, and the like.

Moreover, the I/O die 125 is not limited to containing I/O but can include other types of irregularly arranged hardware blocks such as non-I/O, irregular cores (e.g., a central processor subsystem) or accelerator blocks for video codecs or encryption, which may be accessed by hardware in other layers or dies. Further, the stack 100 may include other irregular collections of non-I/O cores or large single cores in layers other than in the bottom die, which are equally accessible through the connectivity die 115, For example, irregularly arranged cores (e.g., hardware blocks) in a first die forming a processor subsystem can use the connectivity die 115 to perform read and write to regularly arranged memories and cores in another die.

In one embodiment, the processing blocks 110 rely on the I/O blocks in the I/O die 125 to communicate with external devices. However, a disadvantage of having a first die (i.e., the processing die 105) with regularly arranged processing blocks 110 that communicate with irregularly arranged I/O blocks in a second die (e.g., the I/O die 125) is that the location of the processing blocks 110 can affect performance. For example, assuming the connectivity die 115 is omitted, if the processing blocks 110C, 110F, and 110I on the right side of the die 105 want to use the I/O 130A on the left side of the I/O die 125, these processing blocks 110 have to rely on neighboring blocks to rely the data. For example, the processing block 110C may have to rely on interconnects in the processing block 110B to forward data to the processing block 110A which then forwards data down to the I/O 130A. This leads to the disadvantages discussed above where a programmer should be aware of the location of the compute elements since that can affect performance. Further, the local interconnect fabric in each processing block 110 may be used by neighboring blocks, which means the processing blocks 110 may have to be compiled and configured monolithically (e.g., evaluating the processing die 105 has a whole) rather than being able to compile a solution, and configure, each processing block 110 independently.

The configurable interconnects 120 in the connectivity die 115 provide fair access of the processing blocks 110 to the I/O blocks and to avoid having to use a monolithic approach to configuring the processing blocks 110. In one embodiment, the configurable interconnects 120 are software configurable. For example, once kernels are assigned to the processing blocks 110, the interconnects 120 can be configured or programmed to form connections between the processing blocks 110 and the I/O. Stated differently, the interconnects 120 can be used as a gearbox between the regularly arranged processing blocks and the irregularly arranged I/O blocks.

For example, the processing blocks 110A-D may need access to I/O 130 and 145, but not I/O 135 and 140, while the processing blocks 110E-I need access to I/O 135, 140, and 145, but not I/O 130. A compiler can configure the interconnects 120 to provide only the connections that are required for that configuration of the processing blocks 110. However, in other embodiments, each of the processing block 110 may need access to each of the I/Os 130-145 in which case the interconnects 120 can be configured to form these connections.

In one embodiment, the configurable interconnects 120 can form a network, such as a network on a chip (NoC) (e.g., a mesh topology or other types of topology such as a butterfly or torus), but this is not requirement. While a network may provide greater flexibility, simpler switchable point-to-point interconnects may be sufficient for other implementations. For example, a finite number of interconnects 120 may be connected to each of the processing blocks 110 which can be switchable connected to the I/O blocks in the I/O die 125. A compiler can then configure the interconnects 120 in response to the functions or kernels assigned to the processing blocks 110. In some embodiments the interconnects 120 may be programmable (requiring a routing solution to be compiled) or not programmable (rules-based routing). A standard interconnect type not requiring a compiler is a full crossbar.

The connectivity die 115 can include other hardware in addition to the interconnects 120, such as embedded processors, memory, address translation circuitry, and the like. However, whether or not the connectivity die 115 has this additional circuitry depends on the type of processing blocks 110 in the stack. Additional possible implementations of the connectivity die 115 will be discussed in FIG. 4.

Figure 2:
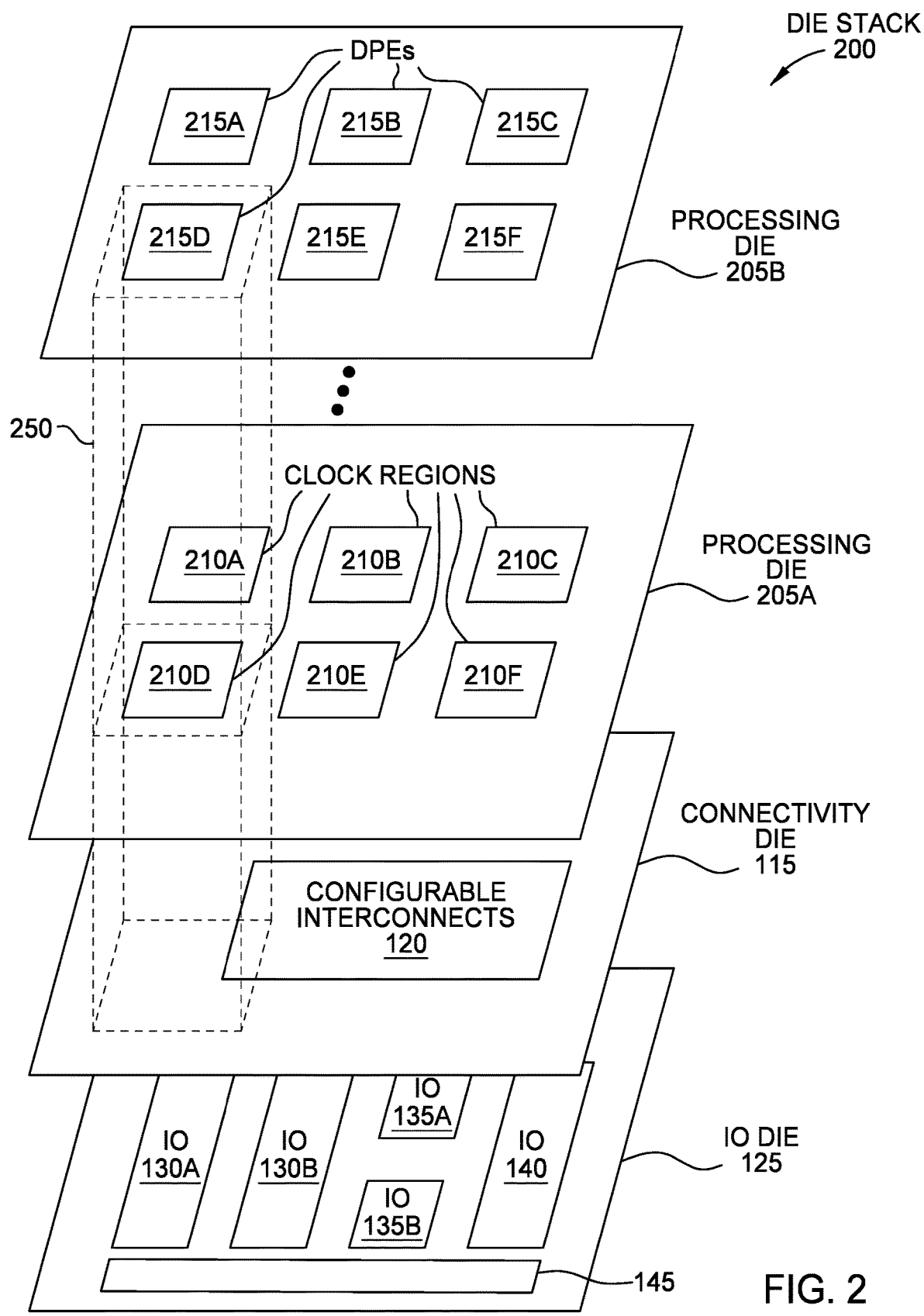
FIG. 2 illustrates a stack of dies that includes a connectivity die, according to an embodiment.

FIG. 2 illustrates a die stack 200 that includes a connectivity die 115, according to an embodiment. The I/O die 125 and the connectivity die 115 in the stack 200 are the same as shown in FIG. 1, and as such, are not described in detail here. However, instead of having one processing die, the stack 200 illustrates using the connectivity die 115 to connect any number of processing dies to the I/O die 125. Further, each of the processing dies 205 can have a different type of processing block.

For example, the processing die 205A includes a plurality of clock regions 210 that may be part of a fabric of programmable logic (PL). The clock regions 210 can include LUTs, configurable logic blocks (CLBs), memory elements, and the like. In one embodiment, the clock regions 210 can be duplicates of each other That is, the clock regions 210 may be homogeneous.

The processing die 205B includes a plurality of DPEs 215. The plurality of DPEs 215 can be arranged in a grid, cluster, or checkerboard pattern in the die 205B. Although FIG. 2 illustrates arranging the DPEs 215 in a 20 array with rows and columns, the embodiments are not limited to this arrangement. Further, the array of DPEs 215 can be any size and have any number of rows and columns formed by the DPEs 215.

In one embodiment, the DPEs 215 are identical. That is, each of the DPEs 215 (also referred to as files or blocks) may have the same hardware components or circuitry. Further, the embodiments herein are not limited to DPEs 215. Instead, the die 205B can include an array of any kind of processing elements, for example, the DPEs 215 could be digital signal processing engines, cryptographic engines, Forward Error Correction (FEC) engines, or other specialized hardware for performing one or more specialized tasks.

In FIG. 2, the die 205B includes DPEs 215 that are all the same type (e.g., a homogeneous array). However, in another embodiment, the DPEs 215 may include different types of engines, but may have the same size. For example, the die 205B may include digital signal processing engines, cryptographic engines, graphic processing engines, and the like where each of these hardware elements takes up the same amount of space on the die 205B. Regardless if the DPEs 215 are homogenous or heterogeneous, the DPEs 215 can include direct connections between DPEs 215 which permit the DPEs 215 to transfer data directly. The DPEs 215 can also have connections to the underlying processing die 205A (e.g., using through silicon vias).

In one embodiment, the DPEs 215 are formed from software-configurable hardened logic—i.e., are hardened. Using hardened logic circuitry to form the hardware elements in the DPE 215 such as program memories, an instruction fetch/decode unit, fixed-point vector units, floating-point vector units, arithmetic logic units (ALUs), multiply accumulators (MAC), and the like can significantly reduce the footprint of the array of DPEs 215 in the die 205B. Although the DPEs 215 may be hardened, this does not mean the DPEs 215 are not programmable. That is, the DPEs 215 can be configured when the die 205B is powered on or rebooted to perform different functions or tasks, or can be runtime-configurable where their function is changed while running.

In one embodiment, the DPEs 215 in the processing die 205B and the clock regions 210 in the processing die 205A form 3D volumes 250. These volumes 250 are logical associations between the DPEs 215 and the clock regions 210. To line up these elements vertically, in one embodiment, the DPEs 215 and the clock regions 210 may be arranged in the same pattern and may have approximately the same size or boundaries. For example, one DPE 215 may be assigned to one clock region 210, or a portion of the array of DPEs 215 (e.g., a sub-array of 2×2 DPEs) is assigned to each clock region 210 to form a 3D volume 250. This can depend on the size of the DPEs 215 relative to the size of the dock regions 210.

By aligning the DPEs 215 to corresponding clock regions 210, the different processing blocks in the processing dies 205A and 205B are provided equal access to the underlying I/O die 125, without affecting the processing blocks in a neighboring 3D volume. That is, the processing blocks in the same 3D volume 250 can be compiled or configured independently of the processing blocks in another 3D volume. The processing blocks in the 3D volume 250 can use dedicated through vias to reach the connectivity die 115 where the interconnects 120 can provide fair access to the underlying I/O blocks in the I/O die 125.

FIG. 2 illustrates that any number of processing dies 205 can be stacked on top of the connectivity die 115. Further, these processing dies 205 can have the same type of processing blocks (e.g., multiple dies of DPEs 215) or have different types of processing blocks, like the example illustrated in FIG. 2.

FIG. 2 also provides redundancy where a redundancy scheme for 3D devices can subdivide planar processing blocks into redundant regions. When a region is defective, signals are redirected to a backup region above or below. In one embodiment, devices may have an entire layer of PL fabric which is unused except for yield tolerance—i.e. there are N "logical" layers, and N+1 "physical" layers. Logical device timing files can be agnostic to whether a given device is using the redundant regions, which has a similar impact to the disruption caused by hardened functions in the fabric.

With a processing die composed of regular, interconnected processing blocks through the connectivity die 115, an alternative redundancy scheme may be implemented using hierarchical routing in which the topmost level of routing is required to pass through a hard NoC in the die 115 using latency insensitive channels. An upper bound of composability may be imposed such that the largest design unit is no greater than one redundant region ("Tile"), composed of several quanta of homogeneous 3D volumes ("Relocatable Region"). Devices may then be binned where identical physical devices have differing numbers of logical "cores" which yielded, by guaranteeing a number of yielding regions per device without exposing the physical location of the regions, as they have been decoupled from I/O floor planning constraints using the configurable interconnects 120 in the connectivity die 115.

Figure 3:
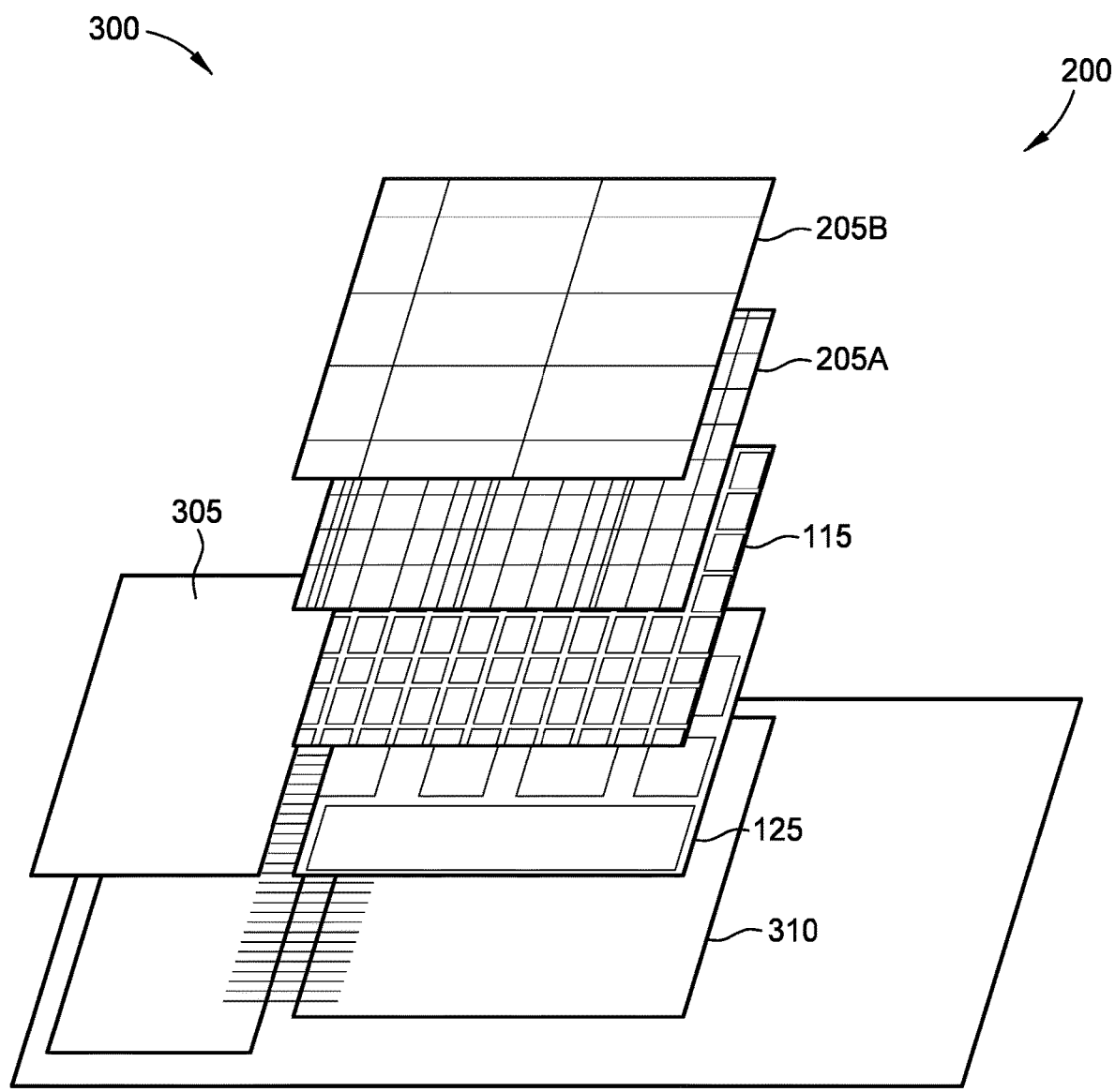
FIG. 3 illustrates a stack of dies on an interposer, according to an embodiment.

FIG. 3 illustrates a device 300 with a die stack 200 on an interposer 310, according to an embodiment. For ease of explanation, the device 300 includes a die stack 200 with the same dies as shown in FIG. 2—the processing dies 205A and 205B, the connectivity die 115, and the I/O die 125. This details of these dies are not discussed here.

The die stack 200 is disposed on an interposer 310 (e.g., a silicon interposer) which includes electrical connections to the I/O die 125 such as solder bumps or a ball grid array. The interposer 310 provides electrical connections to components in the device 300 that are external to the die stack 200. In this example, the interposer 310 provides electrical connections between the I/O die 125 and a HBM 305. But in general, the interposer 310 can provide electrical connections to multiple external components such as chiplets and other die stacks.

Further, the I/O blocks in the I/O die 125 may also communicate with other devices separate from the device 300. For example, the interposer 310 may provide connections to a host computing system in which the device 300 is disposed.

In an alternative embodiment, the configurable interconnects 120 may be incorporated into the processing die 205A, in which case a separate connectivity die 115 can be omitted. That is, the die 205A may have both processing blocks as well as the configurable interconnects 120 (e.g., switchable interconnects or a NoC). In this implementation, the die 205A can be considered both as a processing die and a connectivity die that provides connections between the processing blocks in the upper processing die 205B to the I/O die 125. Thus, in this example, the connectivity die can also have processing blocks such as PL fabric. For instance, the configurable interconnects can be integrated into the PL fabric forming the processing blocks.

Figure 4:
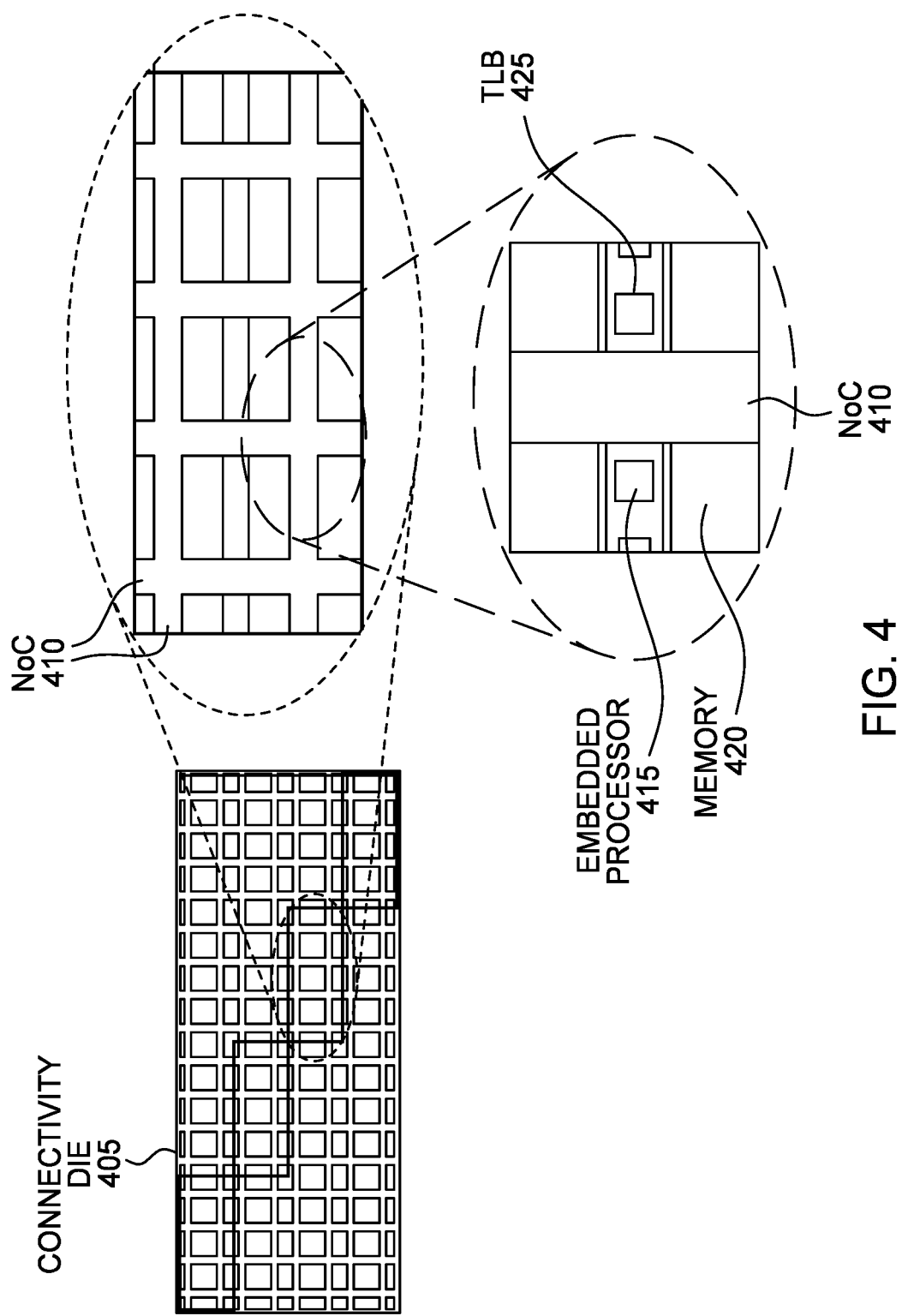
FIG. 4 illustrates a connectivity die, according to an embodiment.

FIG. 4 illustrates a connectivity die 405, according to an embodiment. In this embodiment, the connectivity die 405 includes a NoC 410, embedded processors 415, memories 420, and translation lookaside buffers (TLBs) 425. The NoC 410 is one example of the configurable interconnects 120 discussed in FIG. 1, and can be implemented using, for example, a mesh NoC topology where a router/switch has some number of ports, connecting to adjacent switches in the vertical/horizontal directions. In the proposed configuration, the switches in the NoC 410 can also have ports facing upward/downward to adjacent layers, connecting to processing elements and ports on I/O cores. In one embodiment, the NoC 410 uses router-based packet switching to transfer packets between the I/O blocks in the I/O die with processing blocks in a processing die. However, as mentioned above, a NoC 410 is not necessary, and the configurable interconnects 120 can be implemented using less complicated routing schemes.

Advantageously, the NoC 410 enables access from one region (e.g., a 3D volume 250 in FIG. 2) to any other region without having to compile a soft interconnect and without affecting a neighboring region. That is, the regions can use the NoC 410 to communicate with the I/O die without using hardware resources in a neighboring region. Further, the NoC 410 can be used to transmit data between regions (e.g., between two 3D volumes). Referring to FIG. 2, assume that DPE 215A wants to transmit data to DPE 215F, While the processing die 205B may have interconnects between the DPEs 215, in another embodiment, the DPE 215A may transmit data through the processing dies 205B and 205A and use a NoC in the connectivity die 115 to reach an area underneath the DPE 215F. The NoC can then push the data up through the processing die 205A to reach the DPE 215F in the die 205B.

The NoC 410 enables the decoupling of I/O resources in the I/O die from the location of compute resources in the die(s) above. Where the I/O die is irregular due to the various floor planning constraints of the heterogeneous I/O, system management, processor, and other IPs, the connectivity die 405 serves as a "gearbox" to both create the illusion of regularity to the processing die(s) and to provide uniform access to I/O die resources. In one embodiment, the NoC 410 presents a native NoC interface downward to the I/O die, which locally handles each interface depending on the characteristics of the endpoint, translating protocols via NoC Master Units (NMU), NoC Slave Units (NSU), or any suitable NoC traffic protocol translation circuitry.

In one embodiment, the embedded processors 415 are microprocessors. These processors 415 can be formed using small chunks of PL, or can be formed using hardened circuitry. In one embodiment, the embedded processors 415 form a control plane for the die stack that dispatches work to the processing blocks in the upper dies and controls data movement and synchronization. In one embodiment, the embedded processors 415 execute code that loads instructions into the processing blocks and push data through the memories 420 to external memory (e.g., the HBM 305 in FIG. 3) or to the processing blocks in upper layers.

In another embodiments of a connectivity die 405, the embedded processors 415 may be omitted. For example, the processing blocks themselves may have logic that form the control plane for moving data through the Not; 410 and the memories 420 in the connectivity plane. Stated differently, if the processing die(s) have processing blocks that can request data (e.g., processing cores or CPUs), then the embedded processors 415 may not be needed. However, if the processing die(s) have processing blocks that simply process data that is provided to them (without requesting data), then the embedded processors 415 can be used to form the control plane that moves the data through the die stack.

The memories 420 can be used as part of a memory hierarchy in the die stack. For example, upper levels of the memory hierarchy may be in the processing dies (e.g., registers and L1-cache) while the memories 420 form another layer in the hierarchy (e.g., L2). For example, each processing block in a processing die may have registers as well as a shared cache shared by a subset of the processing blocks. In one embodiment, the memories 420 can then form another shared memory for all the processing blocks in all the processing die(s) in the stack.

In one embodiment, the memories 420 may be a last-level memory in the die stack that serves as an interface between memory in the processing die(s) and external memory (e.g., HBM). In one embodiment, the memories 420 are used as buffers to enable the processing blocks in the processing die to communicate without the data traveling off the die stack.

By putting the memories 420 in the connectivity die 405, the bandwidth of 3D-connected memories, which is limited by Z-plane connection (i.e., a connection between dies in the stack) over a 2-dimensional interface, is an order of magnitude greater than communication to L2 memories connected over a linear interface at the periphery of a plane shared with compute resources (e.g., if the memories 420 are disposed on the same die as the processing blocks). Latency to memory connected through Z-interfaces is also low, and retaining memory in more localized memories reduces the power cost of data movement compared to a long-distance XIV traversal when the memories 420 are in the same die as the compute resources. Further, with memory hierarchy up to L2 encapsulated within the regular virtual regions, independently compiled software can manage its own memory hierarchy up to the point of external/main memory, enforcing isolation or controlling communication between libraries through software interfaces.

A combination of the embedded processors 415 and the NoC-attached memories 420 on a dedicated layer allow software-managed synchronization and buffer transfers between the processing blocks in the processing die(s), which allows for efficient communication between libraries compiled independently of one other so long as they share an abstract software interface.

However, other implementations of the connectivity die 115 omit the memories 420, especially in implementations where the embedded processors 415 are also omitted.

The TLB 425 can perform virtual to physical address translation for data moving through the NoC 410. However, for other implementations the TLBs 425 may not be required. For example, the TLS 425 may be used when the data movers in the stack (e.g., the embedded processors 415 or logic within the processing blocks in the processing die(s)) use a virtual address space different from an external address space.

Figure 5A:
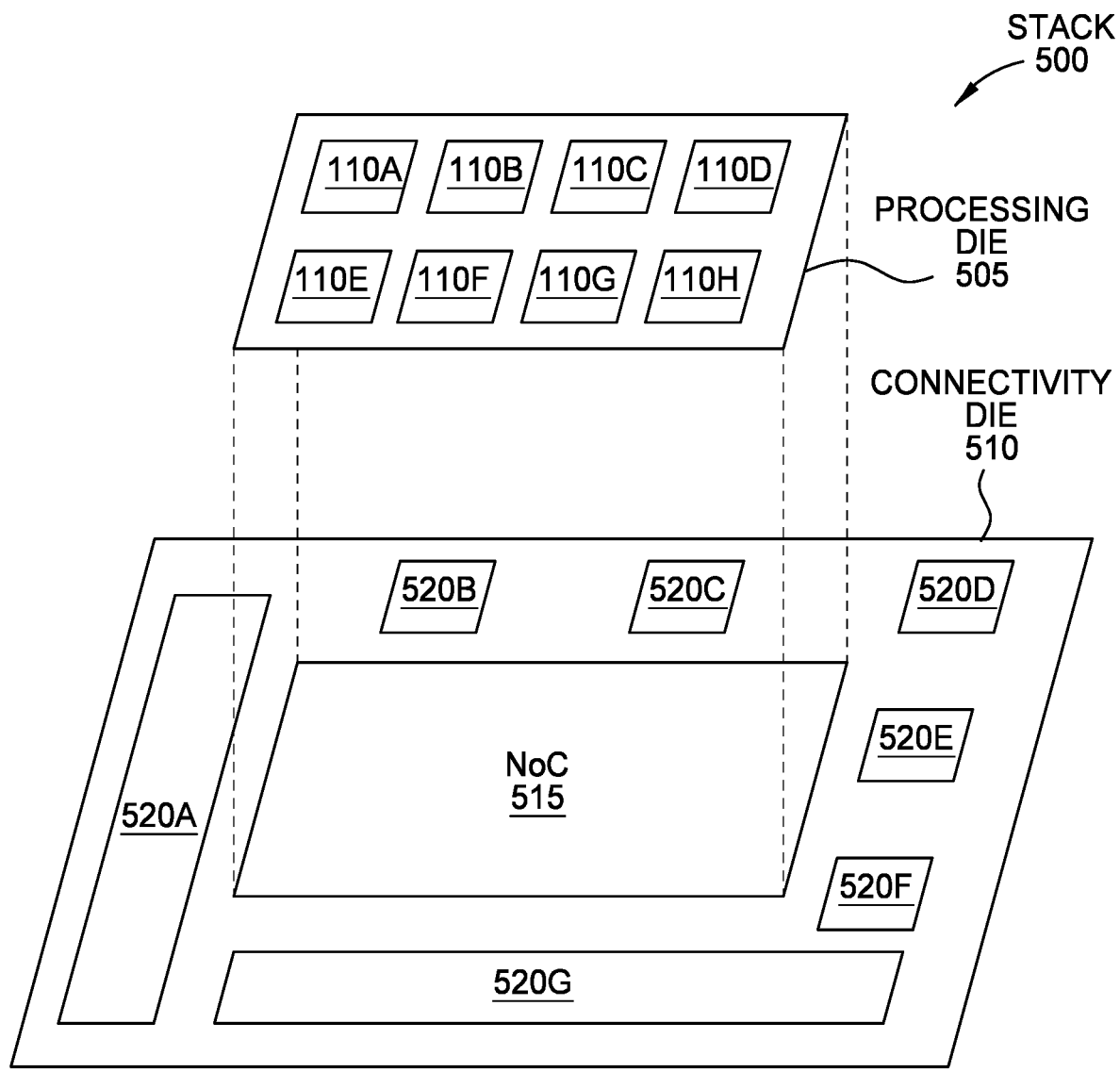
FIGS. 5A and 5B illustrate stacks of dies that include connectivity dies, according to embodiments.

FIG. 5A illustrates a die stack 500 that include a processing die 505 and a connectivity die 510. The processing die 505 includes the regularly arranged processing blocks 110 (e.g., block 110A-110H) which can be any of the hardware elements discussed above.

The connectivity die 510 includes a NoC 515 that is aligned with the processing blocks 110 in the processing die 505. That is, the NoC 515 is disposed underneath the processing blocks 110 so that through vias can be used to connect the processing blocks 110 to the NoC 515. While FIG. 5A illustrates a NoC 515, more generally, any suitable interconnects can be used such as the configurable interconnects 120 discussed above.

In addition to the NoC 515, the connectivity die 510 includes irregularly arranged hardware blocks 520A-G. In one embodiment, the hardware blocks 520 include different types of I/O that interface with different external components as discussed above. However, the hardware blocks 520 are not limited to I/O and can include non-I/O, irregular cores, accelerator blocks, and the like.

FIG. 5A illustrates that the NoC 515 (or any suitable system of configurable or programmable interconnects) can be used to permit each of the processing blocks 110 to access each of the hardware blocks 520. This results in many of the advantageous discussed above.

In one embodiment, the processing blocks 110 are composable, meaning the processing blocks 110 can be configured or stitched together by a compiler at or before runtime to form larger processing blocks 110 that work together to perform a common function. For example, the processing blocks 110 can be FPGA clock regions or DPEs where multiple regions or DPEs can be stitched together to form a single, larger clock region or DPE (e.g., super regions). This is in contrast to processing cores for a processor or CPUs which are not composable since they rely on shared memory to communicate, rather than having local interconnects, and thus cannot be stitched together to form larger hardware blocks. Stated differently, composable hardware blocks 110 have spatial fabrics while non-composable hardware blocks 110 have temporal fabrics.

For composable processing blocks 110, the NoC 515 provides a global interconnect for communicating with the rest of the components in the stack (and external to the stack) without affecting the local interconnects that enable the processing blocks 110 to communicate amongst themselves, thereby preserving the ability for these hardware blocks 110 to be combined to form super regions.

While FIG. 5A illustrates two dies, additional dies can also be stacked on top of the processing die 505 and use the NoC 515 to communicate with the hardware blocks 520.

Figure 5B:
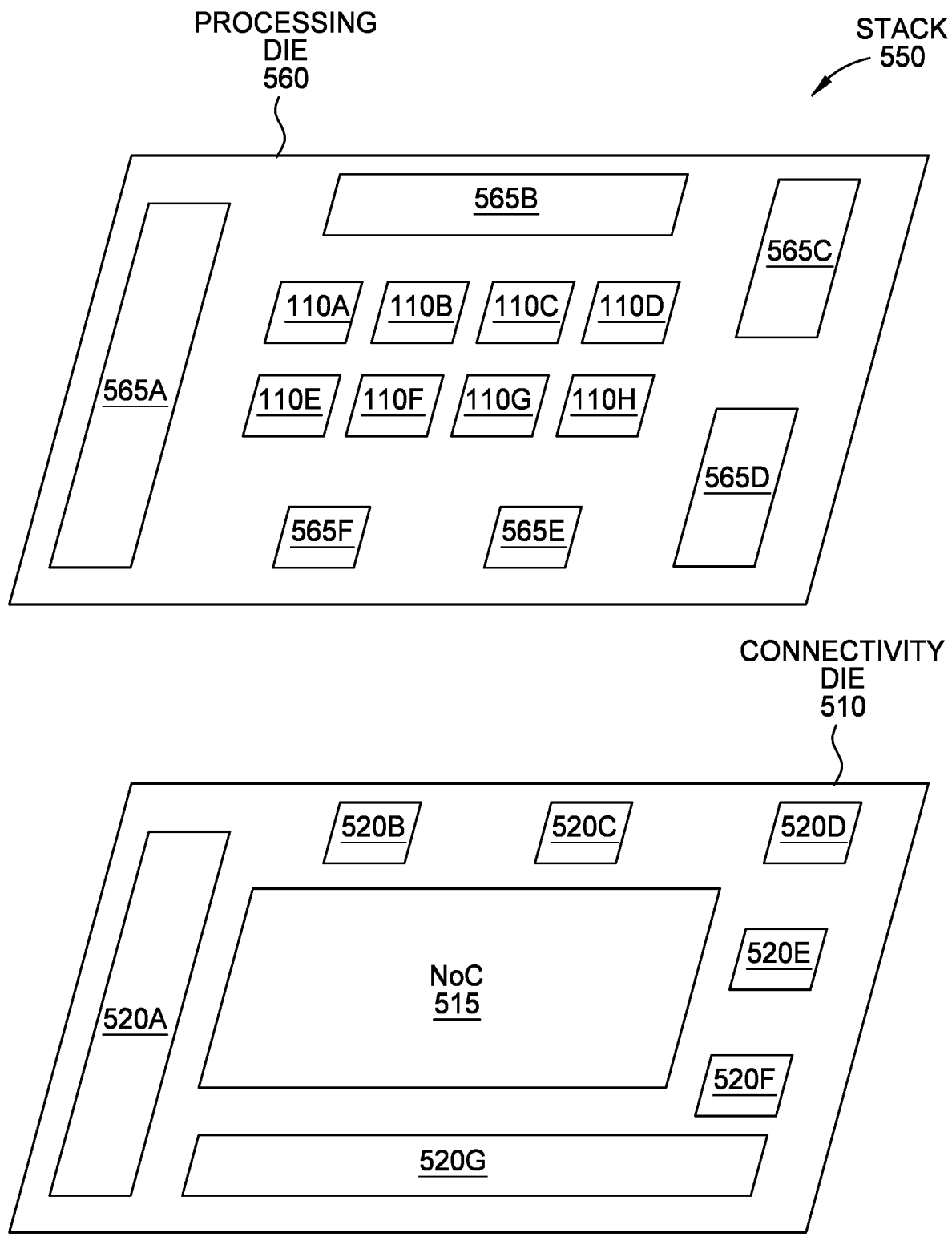

FIG. 5B illustrates a stack 550 that includes a processing die 560 disposed on the connectivity die 510. While the connectivity die 510 is the same, the processing die 560 in FIG. 5B is different from the processing die 505 in FIG. 5A. Namely, the processing die 560 includes irregularly arranged processing blocks 565 disposed along the periphery of the die 560, in addition to the processing blocks 110. The processing blocks 565 may be different types of hardware circuits than the blocks 110. In one embodiment, the processing blocks 565 do not use the NoC 515 to communicate with the hardware blocks 520 in the connectivity die 510. Instead, the processing blocks 565 may have direct connections to the hardware blocks 520. As such, unlike the processing blocks I/O, the processing blocks 565 may not be able to communicate with all the hardware blocks 520 but instead may be limited to communicate with only the hardware blocks 520 that are disposed underneath them.

In one embodiment, FIG. 5A illustrates a chip-on-wafer (CoW) stack where the processing die 505 (i.e., a chip) is smaller than the connectivity die 510 (e.g., a wafer) while FIG. 58 illustrates a wafer-on-wafer (WoW) design where the processing die 560 is the same size as the connectivity die 510.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s), in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A stack, comprising:
   a first semiconductor die comprising a plurality of regularly arranged processing blocks;
   a second semiconductor die comprising a plurality of irregularly arranged I/O blocks, wherein at least two of the plurality of I/O blocks are configured to connect to different types of external components, and wherein the external components are disposed on a same side of an interposer as the stack; and
   a connectivity die disposed between the first die and the second die in the stack, the connectivity die comprising configurable interconnects configured to permit the plurality of processing blocks to communicate with the plurality of I/O blocks.

2. The stack of claim 1, wherein each of the plurality of processing blocks is the same type, wherein at least two of the plurality of I/O blocks are different I/O interfaces.

3. The stack of claim 1, wherein the external components are disposed on different sides of the second die.

4. The stack of claim 1, wherein the plurality of processing blocks is arranged in an array and the plurality of I/O blocks is not arranged in an array.

5. The stack of claim 1, wherein the connectivity die comprises a network on a chip (NoC) that includes the configurable interconnects.

6. The stack of claim 5, wherein the connectivity die further comprises a plurality of embedded processors connected to the NoC and distributed throughout the connectivity die, wherein the plurality of embedded processors form a control plane for the stack that dispatches work to the plurality of processing blocks.

7. The stack of claim 6, wherein the connectivity die further comprises a plurality of NoC-attached memories used by the plurality of embedded processors when dispatching work to the plurality of processing blocks.

8. A stack, comprising:
a first semiconductor die comprising a plurality of regularly arranged processing blocks;
a second semiconductor die comprising a plurality of irregularly arranged hardware blocks, wherein at least two of the plurality of hardware blocks are configured to connect to different types of external components, and wherein the external components are disposed on a same side of an interposer as the stack; and
a connectivity die disposed between the first die and the second die in the stack, the connectivity die comprising configurable interconnects that are programmable to permit each of the plurality of processing blocks to communicate with each of the plurality of hardware blocks.

9. The stack of claim 8, wherein each of the plurality of processing blocks is the same type, and wherein the plurality of hardware blocks are at least one of irregularly arranged I/O blocks, irregularly arranged cores of a processor subsystem, or irregularly arranged accelerator blocks.

10. The stack of claim 8, wherein the connectivity die comprises a network on a chip (NoC) that includes the configurable interconnects.

11. The stack of claim 8, further comprising:
a third semiconductor die comprising a second plurality of regularly arranged processing blocks, wherein the first die is disposed between the connectivity die and the third die,
wherein the configurable interconnects are programmable to permit each of the second plurality of processing blocks to communicate with each of the plurality of hardware blocks in the second die.

12. The stack of claim 11, wherein each of the plurality of processing blocks is a same type and each of the second plurality of processing blocks is a same type, wherein the type of the plurality of processing blocks is different from the type of the second plurality of processing blocks.

13. A stack, comprising:
a first semiconductor die comprising a plurality of regularly arranged processing blocks;
a second semiconductor die comprising a plurality of irregularly arranged I/O blocks; and
a connectivity die disposed between the first die and the second die in the stack, the connectivity die comprising:
configurable interconnects configured to permit the plurality of processing blocks to communicate with the plurality of I/O blocks,
a network on a chip (NoC) that includes the configurable interconnects,
a plurality of embedded processors connected to the NoC and distributed throughout the connectivity die, wherein the plurality of embedded processors form a control plane for the stack that dispatches work to the plurality of processing blocks,
a plurality of NoC-attached memories used by the plurality of embedded processors when dispatching work to the plurality of processing blocks, and
a plurality of translation lookaside buffers (TLBs) used by the plurality of embedded processors to perform address translation.

14. The stack of claim 13, wherein each of the plurality of processing blocks is the same type, wherein at least two of the plurality of I/O blocks are different types of circuitry.

15. The stack of claim 14, wherein the at least two of the plurality of I/O blocks are configured to connect to different types of external components.

16. The stack of claim 13, wherein the NoC is disposed in a center of the connectivity die and the plurality of I/O blocks are disposed along multiple sides of the NoC, and wherein the plurality of processing blocks are aligned with the NoC in the stack.

17. The stack of claim 13, wherein the plurality of processing blocks are composable hardware blocks that can be combined to form larger processing blocks that perform a common function.

* * * * *